(12) United States Patent
Lauer et al.

(10) Patent No.: US 10,667,465 B1
(45) Date of Patent: Jun. 2, 2020

(54) DEBRIS-COLLECTING APPARATUS AND METHOD OF COLLECTING DEBRIS

(71) Applicant: BILLY GOAT INDUSTRIES, INC., Lee's Summit, MO (US)

(72) Inventors: G. Kent Lauer, Lee's Summit, MO (US); William Jackson Morton, III, Cleveland, OH (US)

(73) Assignee: Billy Goat Industries, Inc., Lee's Summit, MO (US)

(*) Notice: Subject to any disclaimer, the term of this patent is extended or adjusted under 35 U.S.C. 154(b) by 24 days.

(21) Appl. No.: 15/376,067

(22) Filed: Dec. 12, 2016

Related U.S. Application Data

(63) Continuation of application No. 13/786,107, filed on Mar. 5, 2013, now Pat. No. 9,642,508, which is a continuation-in-part of application No. 13/739,716, filed on Jan. 11, 2013, now Pat. No. 9,480,376, which is a continuation-in-part of application No. 29/423,961, filed on Jun. 6, 2012, now Pat. No. Des. 702,902, which is a continuation-in-part of
(Continued)

(51) Int. Cl.
  *A01D 43/063* (2006.01)
  *A01D 43/077* (2006.01)
  *A01G 20/43* (2018.01)
  *A01D 101/00* (2006.01)

(52) U.S. Cl.
  CPC ....... *A01D 43/0636* (2013.01); *A01D 43/077* (2013.01); *A01G 20/43* (2018.02); *A01D 2101/00* (2013.01)

(58) Field of Classification Search
  CPC .......... A47L 9/1683; A47L 9/14; A47L 9/149; A47L 9/1608; B01D 2239/0435; B04C 2009/001; A01G 1/125
  See application file for complete search history.

(56) References Cited

U.S. PATENT DOCUMENTS

| 1,691,536 A | 11/1928 | Winslow et al. |
| 2,074,818 A | 3/1937 | Watson |

(Continued)

OTHER PUBLICATIONS

US. Appl. No. 13/786,107 Notice of Allowance, dated Nov. 30, 2016.
(Continued)

*Primary Examiner* — Katelyn B Whatley
(74) *Attorney, Agent, or Firm* — Foley & Lardner LLP

(57) ABSTRACT

Debris-collecting systems and bagging apparatus for debris-collecting systems are provided. One bagging apparatus includes a primary bag and a dust skirt configured to wrap around the primary bag. At least an inner face of the dust skirt has an electrical charge. One debris-collecting apparatus includes an input portion, a bagging portion, and a draft inducer for drawing the air and debris through the input portion and to the bagging portion. The bagging portion has a hood, a primary bag removably positioned lowerly adjacent the hood, a dust skirt configured to wrap around the primary bag, and a bagging passage for directing air and debris to the hood from the input portion. The hood has a helical configuration extending from the bagging passage toward the primary bag. At least an inner face of the dust skirt is electrically charged. A frame having at least one wheel facilitates transportation.

8 Claims, 12 Drawing Sheets

Related U.S. Application Data application No. 29/423,955, filed on Jun. 6, 2012, now Pat. No. Des. 706,005.

(60) Provisional application No. 61/624,688, filed on Apr. 16, 2012.

(56) References Cited

U.S. PATENT DOCUMENTS

| | | |
|---|---|---|
| 2,248,181 A | 7/1941 | Little |
| 2,542,635 A * | 2/1951 | Davis ............... A47L 9/1608 55/399 |
| 3,246,459 A | 4/1966 | Goldberg et al. |
| 3,353,340 A | 11/1967 | Carsey |
| 3,987,606 A | 10/1976 | Evans |
| 4,246,013 A | 1/1981 | Truhan et al. |
| 4,600,410 A | 7/1986 | Baillie et al. |
| D294,031 S | 2/1988 | Hosonuma |
| 4,749,386 A | 6/1988 | Strohmeyer et al. |
| 4,819,417 A | 4/1989 | Bryant et al. |
| D306,787 S | 3/1990 | Candella |
| 5,306,534 A | 4/1994 | Bosses |
| 5,390,865 A | 2/1995 | Vandermolen |
| 6,658,833 B2 * | 12/2003 | Dunning ............ A47L 9/1608 56/202 |
| 6,904,742 B2 | 6/2005 | Dunning et al. |
| 8,034,192 B2 | 10/2011 | Ringer et al. |
| D651,775 S | 1/2012 | Cheng |
| D693,851 S | 11/2013 | Fujiwara |
| 2005/0279061 A1 | 12/2005 | Broughton |
| 2005/0283942 A1 | 12/2005 | Palazzolo |
| 2006/0277714 A1 * | 12/2006 | Dunning ............ A47L 9/1608 15/405 |
| 2008/0196196 A1 | 8/2008 | Conrad |
| 2009/0104033 A1 | 4/2009 | Rappin |
| 2013/0115863 A1 | 5/2013 | Mizutani et al. |

OTHER PUBLICATIONS

"Outdoor Vacuum for Parking Lots & Sidewalks, Billy Goat QV Vacuum". Posted by: mbgosson on Jun. 22, 2012. <https://www.youtube.com/watch?v=qdaa-Pyiadk>.

Billy Goat MV650H Plush Vacuum Owner's Manual, Jan. 16, 2011. <http://billygoat.com/data/Products/60/manuals/840186%20F030409A.pdf> Retrieved via Wayback Machine on Aug. 18, 2015 https:web.archive.org/web/20110116135639/http://billygoat.com/data/Products/60/manuals/840186%20F030409A.pdf.

Technical Data Sheet for Technostat® 150, Jan. 25, 2011.

"Technostat Plus Electrostatic Filter Media", Hollingsworth & Vose, 2010.

\* cited by examiner

DEBRIS-COLLECTING APPARATUS AND METHOD OF COLLECTING DEBRIS

RELATED APPLICATIONS

This application is a continuation of U.S. patent application Ser. No. 13/786,107 filed Mar. 5, 2015; which is a continuation-in-part of U.S. patent application Ser. No. 13/739,716 filed Jan. 11, 2013, now U.S. Pat. No. 9,480,376; which claims priority: to provisional U.S. Patent Application No. 61/624,688 filed Apr. 16, 2012; as a continuation-in-part of U.S. patent application Ser. No. 29/423,955 filed Jun. 6, 2012, now U.S. Design Pat. D706,005; and as a continuation-in-part of U.S. patent application Ser. No. 29/423,961 filed Jun. 6, 2012, now U.S. Design Pat. D702,902. Priority is claimed to each, and the disclosure of each is incorporated herein in its entirety by reference.

BACKGROUND

The invention relates generally to debris-collecting systems and bagging apparatus for debris-collecting systems. Debris-collecting systems, such as leaf vacuums, typically have an input portion through which debris may enter, a bagging apparatus (typically a bag constructed of polyester non-woven felt or woven nylon), and a rotating member or other device for creating a current of air toward the bagging apparatus. When a current of air is created, the debris is moved by the current of air from the input portion to the bagging apparatus. Importantly, the bagging apparatus must allow air to pass; otherwise, the current of air will stop moving to the bagging apparatus with sufficient force to transport the debris from the input portion to the bagging apparatus. This raises contradictory priorities that must be addressed in the design of the bagging apparatus, as a porous bag is often needed for airflow considerations, but may also allow debris to pass through (thus impeding the entire point of using the debris-collecting system).

Moreover, even when a debris-collecting system is designed such that the bagging apparatus is sufficiently porous yet still—at least initially—collects an acceptable amount of debris, the debris often obstructs (or "clogs") the bag pores. As a result, to maintain the necessary airflow to draw a desired amount of debris through the input portion, the bag must be emptied or exchanged well before the bag is full in traditional debris-collecting systems.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a bagging apparatus for a debris-collecting system includes a primary bag and a dust skirt. The dust skirt is configured to wrap around the primary bag, and at least an inner face of the dust skirt has an electrical charge.

In another embodiment, a debris-collecting apparatus includes an input portion, a bagging portion, and a draft inducer for drawing the air and debris through the input portion and to the bagging portion. The bagging portion has a hood, a primary bag removably positioned lowerly adjacent the hood, a dust skirt configured to wrap around the primary bag, and a bagging passage for directing air and debris to the hood from the input portion. The hood has a helical configuration extending from the bagging passage toward the primary bag, and at least an inner face of the dust skirt has an electrical charge. A frame is operatively coupled to the input portion, the bagging portion, and the draft inducer. The frame has at least one wheel to facilitate transportation.

DETAILED DESCRIPTION

Embodiments of the current invention provide debris-collecting systems and bagging apparatus for debris-collecting systems.

Figure 1:
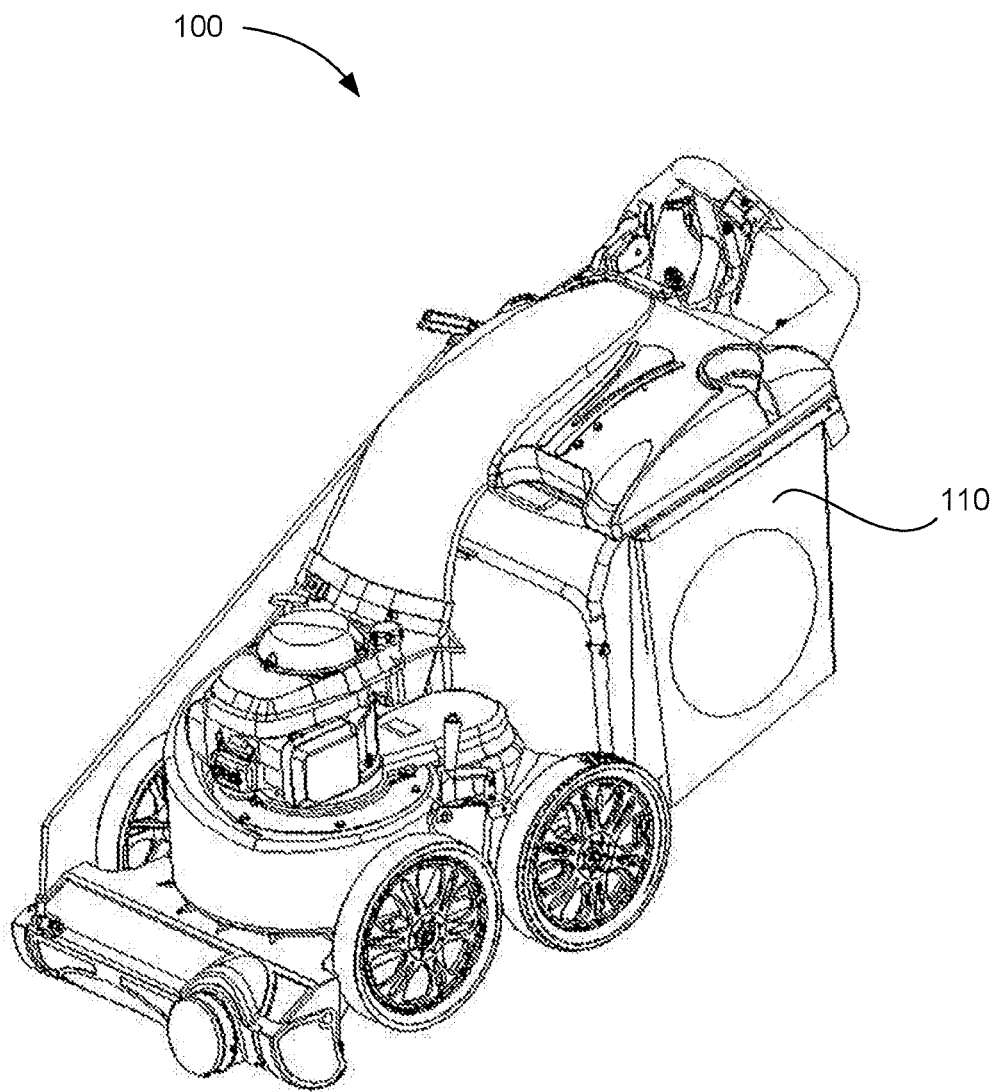
FIG. 1 is a perspective view of a prior art debris-collecting system.

FIG. 1 shows a prior art debris-collecting system 100, which includes a prior art woven nylon bag 110. When debris enters the bag 110, at least a small portion of the debris escapes through pores in the bag 110.

Figure 2:
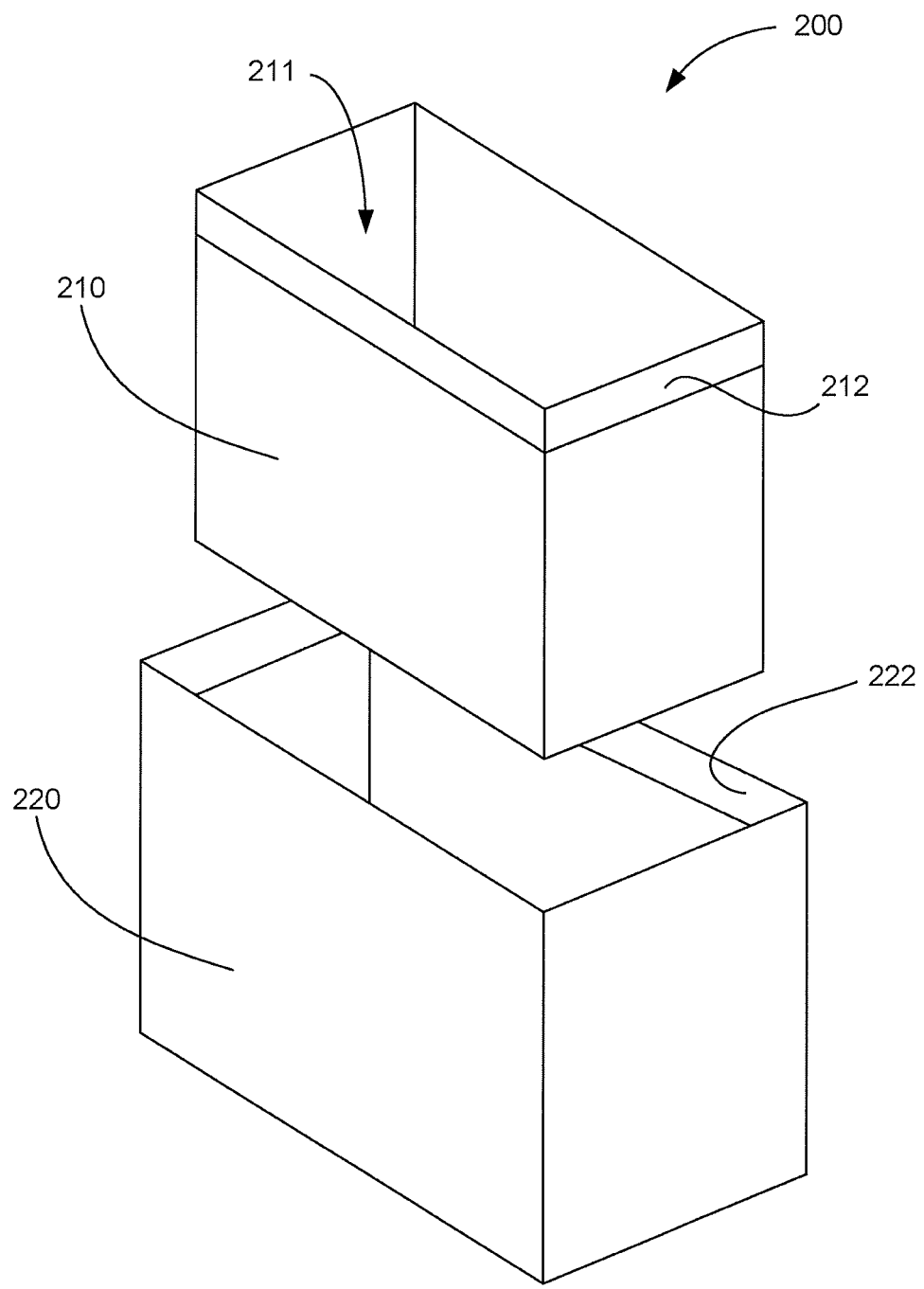
FIG. 2 is an exploded view of a bagging apparatus according to one embodiment of the current invention.

FIG. 2 shows a bagging apparatus 200, which may be used (for example) with the debris-collecting system 100. The bagging apparatus 200 includes a primary bag 210 and a dust skirt 220. The primary bag 210 may be constructed of polyester non-woven felt, woven nylon, or any other desirable material. While the primary bag 210 may have various shapes and sizes, it will typically have an open end 211 through which the debris may enter and be removed.

The dust skirt 220 is configured to wrap around the primary bag 210, and the bagging apparatus 200 may include structure for holding the dust skirt 220 outside the primary bag 210. For example, hook and loop fasteners 212, 222 may join the dust skirt 220 to the primary bag 210. If hook and loop fasteners 212, 222 are used, it may be desirable for the hook fasteners 212 to be located on the primary bag 210, and for the loop fasteners 222 to be located on the dust skirt 220. Placing the hook fasteners 212 on the primary bag 210 instead of on the dust skirt 220 may prevent undesired interaction between the hook fasteners 212 and the primary bag 210 when the dust skirt 220 is pulled over the bag 210. Those skilled in the art will appreciate that various structure may be used to removably secure the dust skirt 220 outside the primary bag 210, and also that various structure may be used to temporarily secure the primary bag 210 in a debris-collecting system.

The composition of the dust skirt 220 may be particularly important in the desirable functioning of the bagging apparatus 200. In one embodiment, the dust skirt 220 is constructed of an electrically-charged high efficiency filter material, such as but not limited to the electrically-charged blend of synthetic fibres sold under the trademark TECHNOSTAT™ by Hollingsworth & Vose of East Walpole, Mass. The electrical charge may be generated on at least an inner face of the material during the manufacturing process, and may attract debris passing through the primary bag 210—preventing the debris from passing through the dust skirt 220.

Although the dust skirt 220 consisting essentially of the electrically-charged blend of fibres may be suitable for collecting debris that passes through the primary bag 210, it may nevertheless have various shortcomings. The dust skirt 220 may, for example, be difficult to empty—or even use—without tearing or wearing a hole in the dust skirt 220. Moreover, it may be difficult to place graphics on the dust skirt 220. These issues may be addressed in some embodiments, such as shown in FIG. 3.

Figure 3:
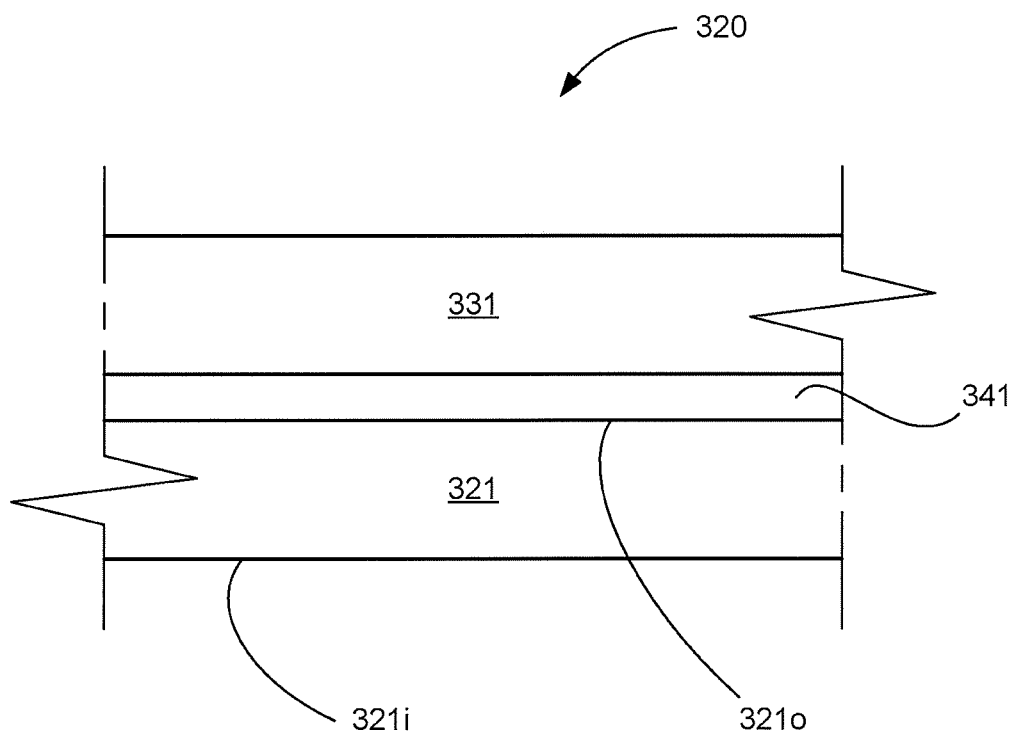
FIG. 3 is a section view of a dust skirt according to another embodiment of the current invention.

FIG. 3 shows a cross-section of a dust skirt 320 that is substantially similar to the dust skirt 220, except as specifically noted and/or shown, or as would be inherent. The dust skirt 320 includes a first layer 321 having inner and outer faces 321i, 321o, and at least the inner face 321i includes the electrical charge for attracting debris. The first layer 321 may, for example, be the same as the material in the dust skirt 220. An external layer 331 is laminated, sewn, or joined to the outer face 321o of the first layer 321. While various materials may be used for the external layer 331, it may be particularly desirable to use a polyester or nylon or other woven or non-woven fabric such as that sold under the trademark C-TEX™ by The Cleveland Canvas Goods Mfg. Co. of Cleveland, Ohio.

Lamination may occur in various ways, but typically involves use of an adhesive 341 to couple the layers 321, 331 together. It may be desirable for the adhesive 341 to be applied in a manner that does not saturate the inner face 321i of the first layer 321. And if heating or pressurizing is used during lamination, it may be particularly desirable to do so in a way that does not substantially reduce the electrical charge of the inner face 321i or substantially reduce the airflow of the filter material.

The dust skirt 320 may be particularly desirable when compared to the dust skirt 220, as the dust skirt 320 may be more durable than the dust skirt 220. In some embodiments, the dust skirt 320 may even be beaten against a concrete floor or other abrasive element without any substantial damage to the dust skirt 320. Even further, it has been surprising to find that the dust skirt 320 may be sprayed using a high-powered air nozzle in close proximity (and even with the air nozzle touching the external layer 331) without any significant reduction in function of the dust skirt 320. Such spraying may quickly cause the dust skirt 220 to fail. In addition, indicia may be placed on the dust skirt 320 (i.e., on the external layer 331), either before or after the layers 321, 331 are laminated together.

While using the bagging apparatus 200—either with the dust skirt 220 or the dust skirt 320—may be beneficial in various debris-collecting systems, it may be particularly desirable for the bagging apparatus 200 to be incorporated into a debris-collecting system 1000 shown in FIGS. 4 through 11.

As shown in FIGS. 4 through 11, the debris-collecting system 1000 according to one embodiment includes an input portion 1110, a bagging portion 1150, a draft inducer 1120 for drawing debris through the input portion 1110 and to the bagging portion 1150, and a frame 1130 with wheels 1132 allowing the apparatus 1000 to be easily transported. The input portion 1110, the draft inducer 1120, and the frame 1130 are shown to be typical elements in debris-collecting apparatus. However, those skilled in the art will appreciate that alternate configurations (whether now existing or later developed) may be used.

Figure 11:
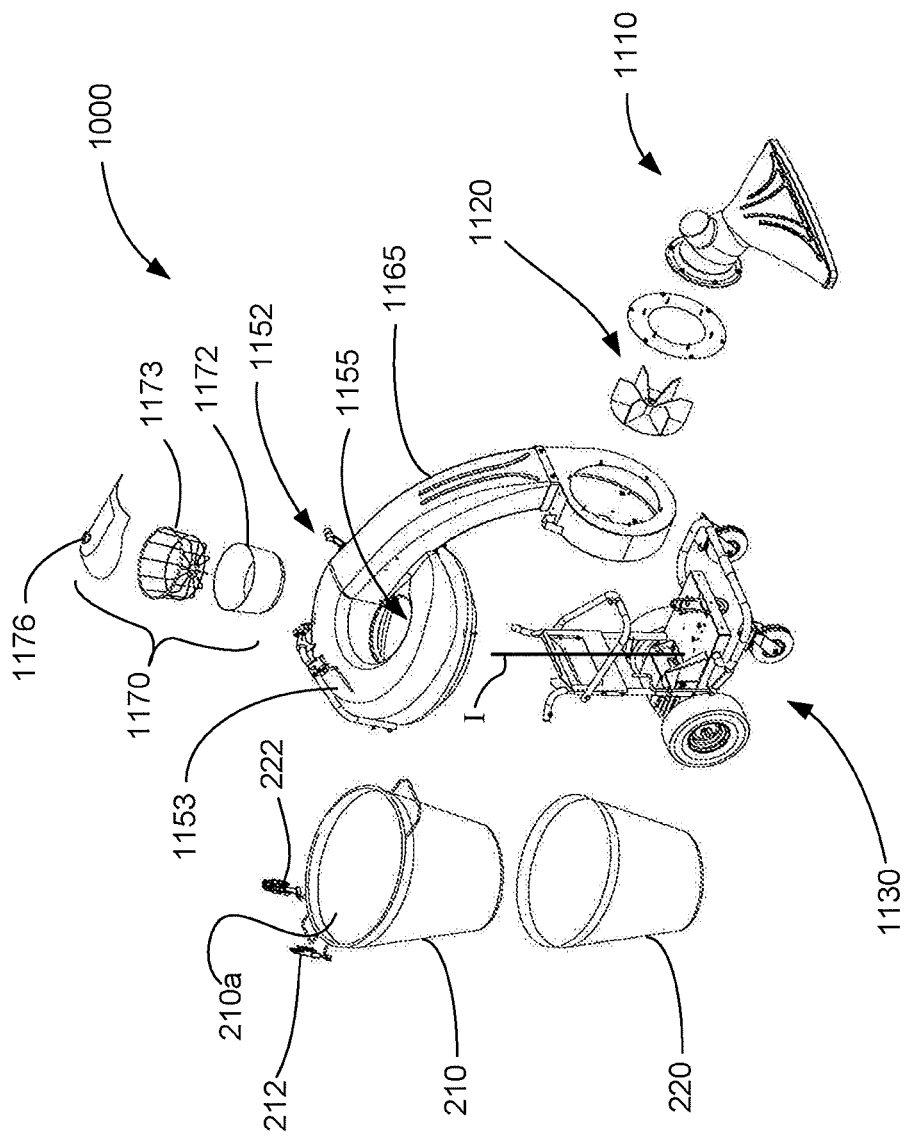
FIG. 11 is an exploded view of the debris-collecting apparatus of FIG. 4.

Focus is now directed to the bagging portion 1150, which includes a hood 1152, the bagging apparatus 200, and a bagging passage 1165 directing debris to the hood 1152 from the input portion 1110. The hood 1152 includes a helical configuration 1153 extending from the bagging passage 1165 toward the bagging apparatus 200, which is removably located lowerly adjacent the hood 1152. It may be desirable for the helical configuration 1153 of the hood 1152 to extend such that it directs air and debris from the bagging passage 1165 to a point below where the air and debris enter the hood 1152 from the bagging passage 1165 (as shown in FIGS. 4, 6, 8, and 11), causing the air and debris to travel in a downward spiral to the bagging apparatus 200. It may further be desirable for the helical configuration 1153 to extend at least two hundred and seventy degrees about an imaginary vertical axis I, and it may be even more desirable for the helical configuration 1153 to extend at least three hundred and sixty degrees about the imaginary vertical axis I as shown in FIG. 11.

While the pitch of the helical configuration 1153 may vary, depending on for example the diameter of the helical configuration 1153, it may be desirable for the pitch to be between about five and eight inches of drop per revolution.

Figure 9:
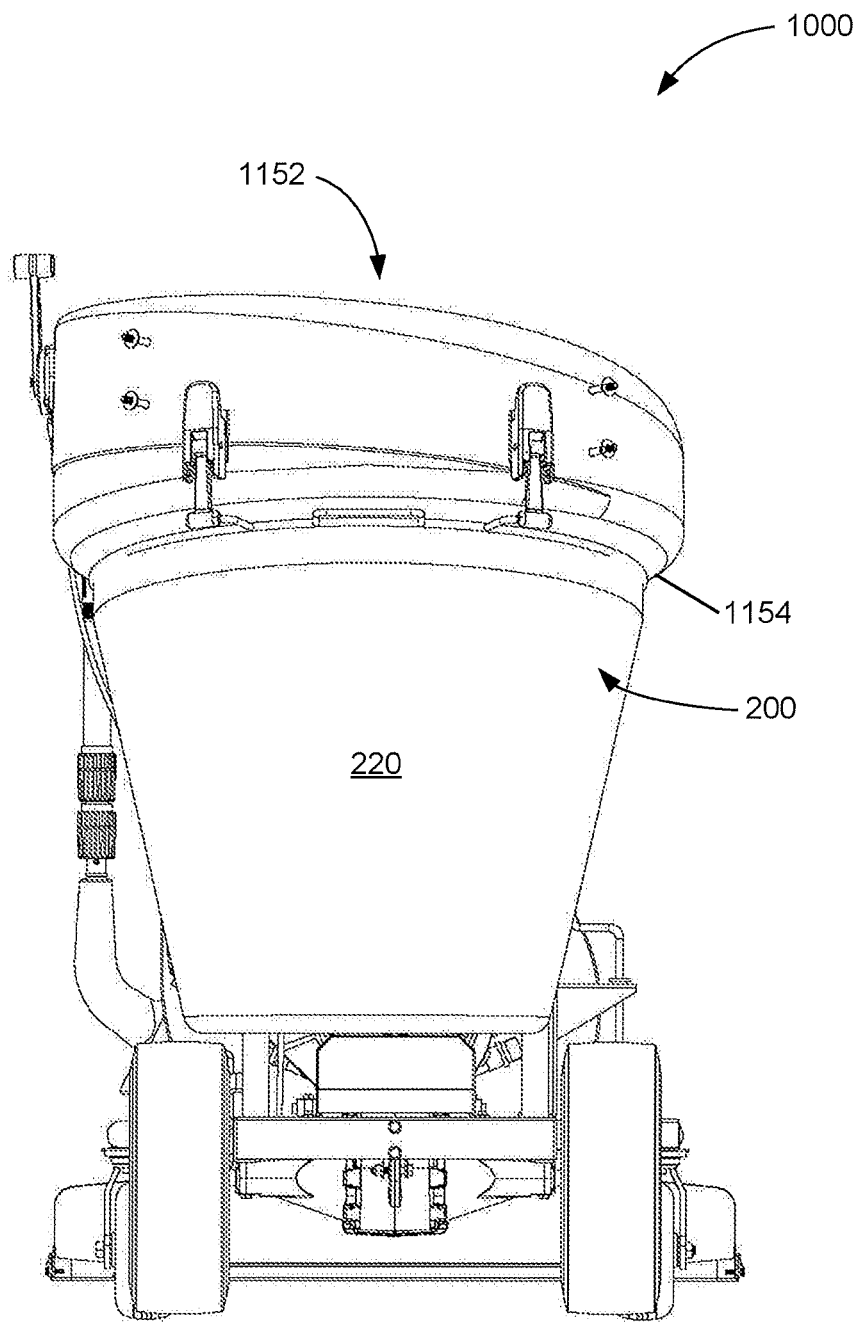
FIG. 9 is a rear view of the debris-collecting apparatus of FIG. 4.
Figure 10:
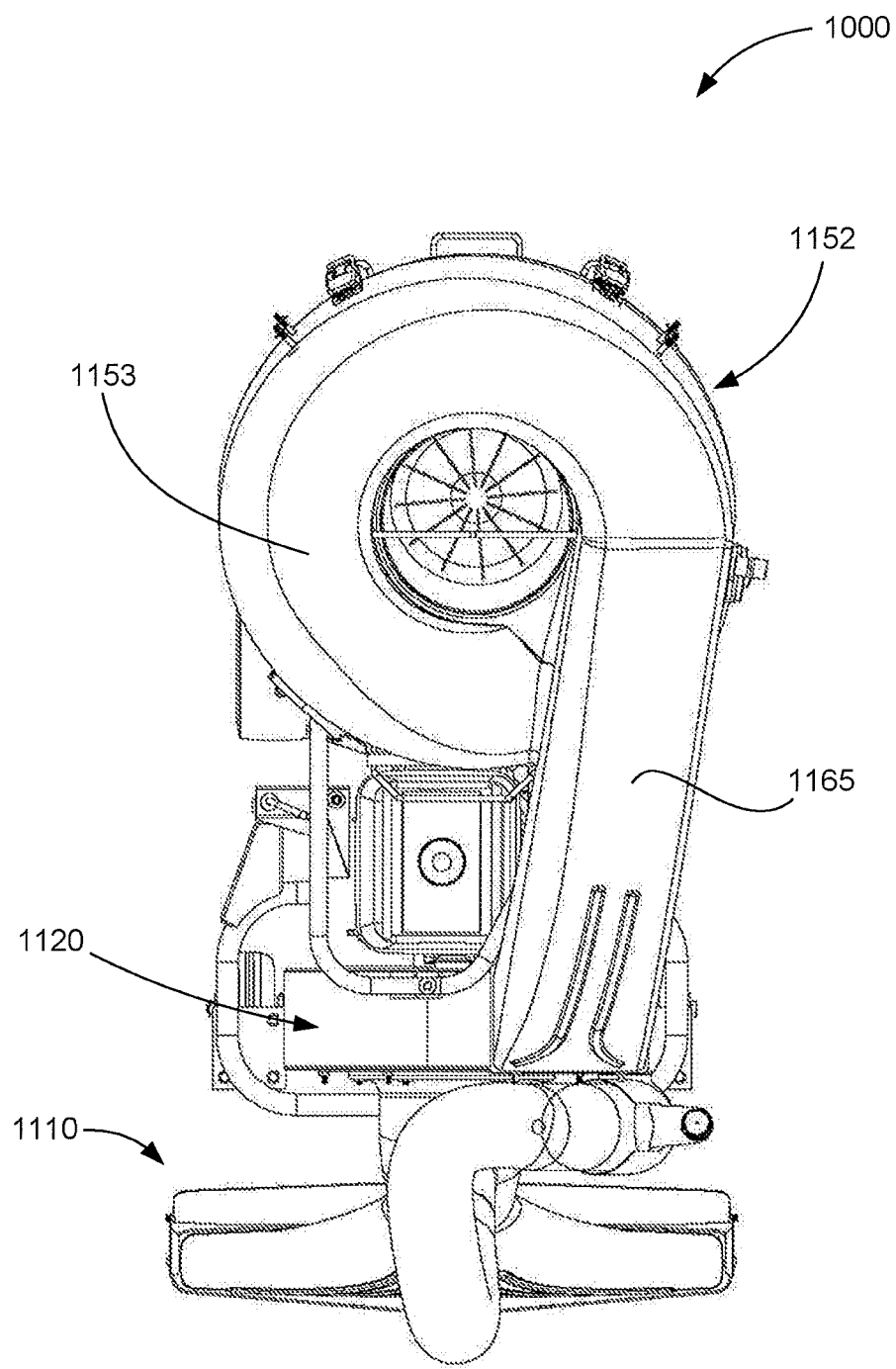
FIG. 10 is a top view of the debris-collecting apparatus of FIG. 4, with a deflecting member removed for illustration.

As best shown in FIG. 9, a ramp 1154 may be located at a lower end of the helical configuration 1153 to direct air and debris away from the hood 1152. This may enhance the helical travel of air and debris into the bagging apparatus 200. The ramp 1154 may function as desired by extending from about ten degrees to forty-five degrees, and it may be particularly desirable for the ramp 1154 to extend at approximately twenty-seven degrees as shown. Diameter, depth, and pitch of the helical configuration may affect the optimal angle of the ramp 1154.

The ramp 1154 may act as a bridge between the helical configuration 1153 and the bagging apparatus 200, with the bagging apparatus 200 having a smaller diameter than the helical configuration 1153, as shown in the drawings. Alternately, the ramp 1154 may be internal structure, allowing the helical configuration 1153 and the bagging apparatus 200 to have generally the same diameter. And while the drawings show the ramp 1154 as being integral with the hood 1152, in some embodiments the ramp 1154 may be integral with the bagging apparatus 200 or distinct from both the hood 1152 and the bagging apparatus 200. Although the ramp 1154 may generally extend fully about the lower end of the helical configuration 1153 (i.e., 360 degrees), it may be possible—and especially when the ramp 1154 is internal structure—for the ramp 1154 to extend less than 360 degrees.

Figure 12A:
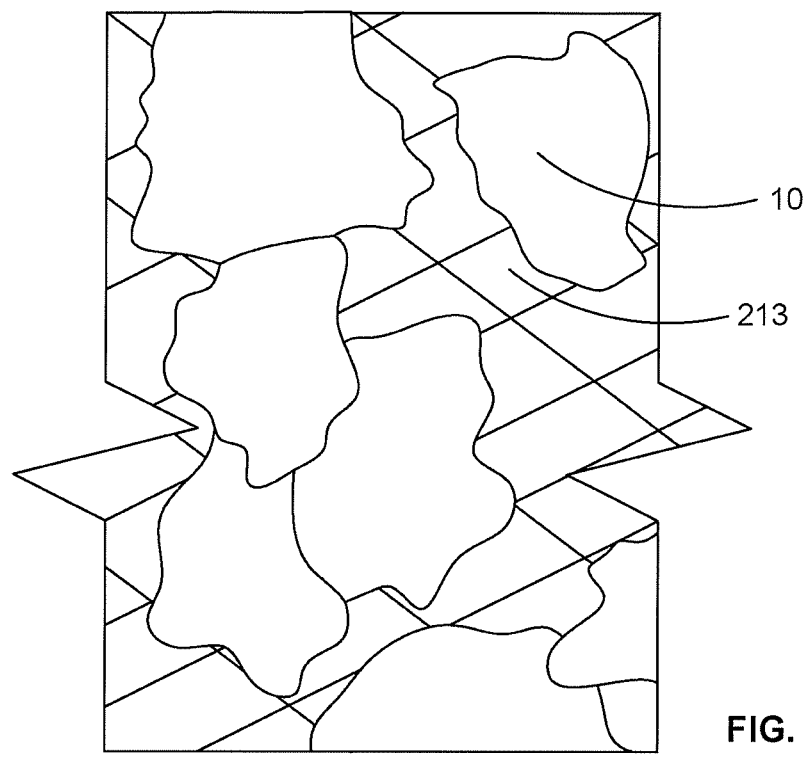
FIG. 12a illustrates debris build-up along bag pores in prior art systems.
Figure 12B:
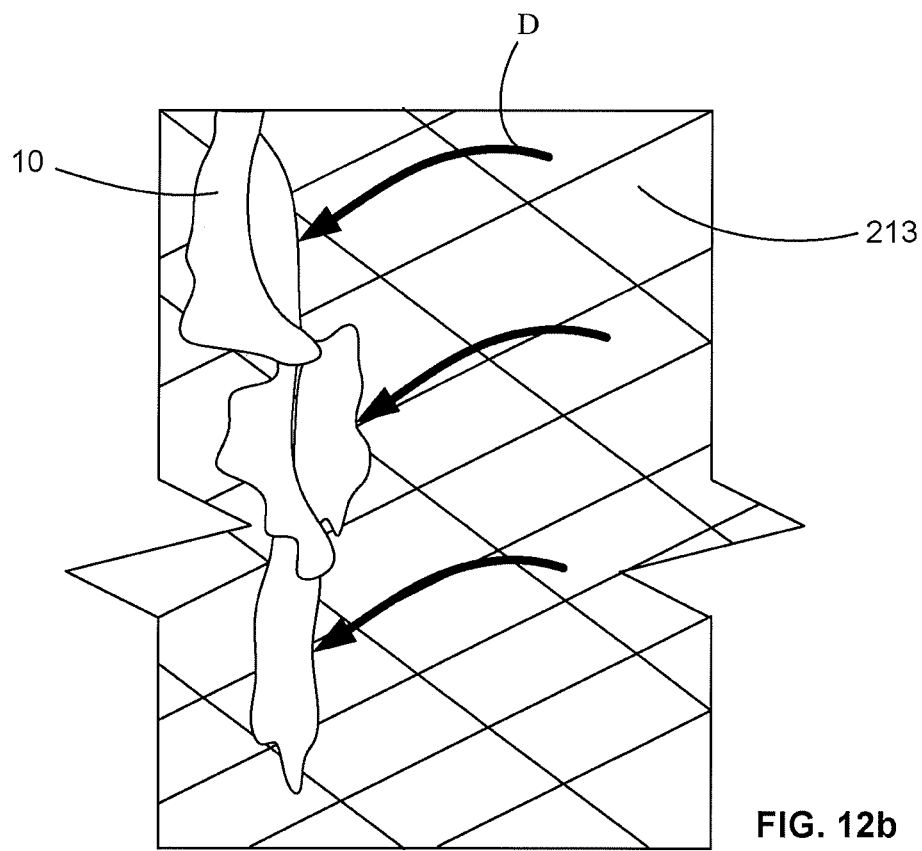
FIG. 12b illustrates debris being dislodged from bag pores during use of the embodiment of FIG. 4.

Contrary to airflow in prior art systems, where debris is allowed to collect along the bag and obstruct air from exiting, the airflow caused by the helical configuration 1153 (either alone, or especially in tandem with the ramp 1154) may cause a self-cleaning effect where debris entering the bagging apparatus 200 dislodges at least a portion of debris collected at an inner face 210a (FIG. 11) of the primary bag 210. This dislodging is illustrated in FIGS. 12a and 12b (which are not to scale) and may aid in allowing debris to collect away from the inner face 210a of the primary bag 210 and increase the amount of the bag capacity that may be effectively used. Pores 213 in the air permeable bag 210 are shown covered by debris 10 in FIG. 12a, in accordance with systems without helical airflow. FIG. 12b represents an effect of airflow in helical direction D according to an embodiment of the current invention, and shows the debris 10 being dislodged to clear pores 213 in the bag 210.

As shown in FIG. 11, an opening 1155 may be formed in the hood 1152 inside the helical configuration 1153, and a filter 1170 may be removably positioned to prevent debris from exiting through the opening 1155. The opening 1155 and filter 1170 may allow a low-pressure area to form away from the inner face 210a of the bag 210, further drawing debris away from the inner face 210a, and may provide an additional air outlet to maintain airflow through the input portion 1110. In some embodiments, the filter 1170 may extend downwardly inside the hood 1152 and/or the bag 210 to provide an inner boundary around which debris must pass to further define helical movement of air and debris. And the helical movement of air and debris may cause a self-cleaning effect where debris collected on the filter 1170 is dislodged, similar to the self-cleaning effect discussed above. This dislodging may aid in allowing debris to collect throughout the bag 210 and increase the amount of the bag capacity that may be effectively used.

Figure 4:
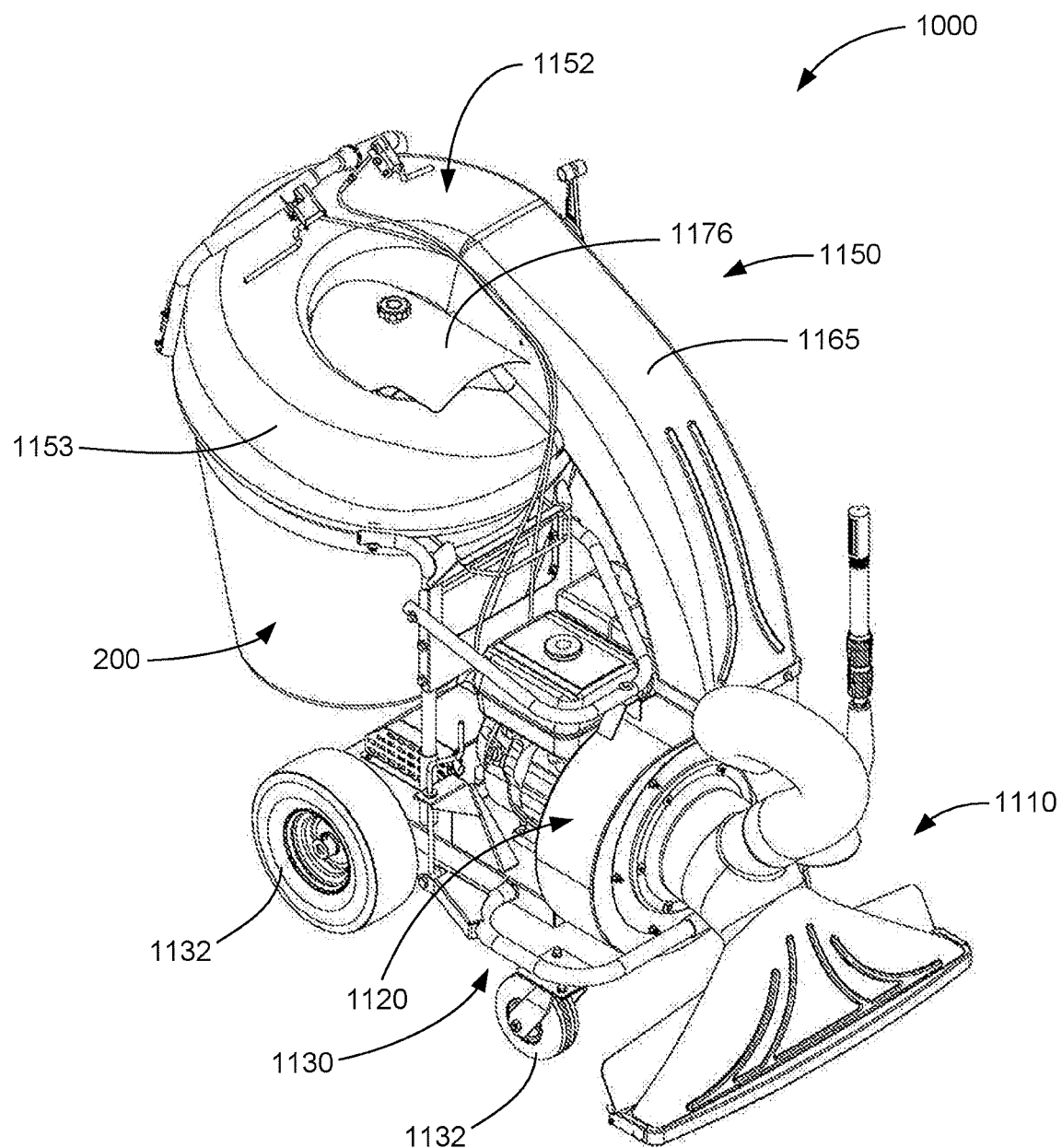
FIG. 4 is a perspective view of a debris-collecting apparatus according to an embodiment of the current invention.
Figure 5:
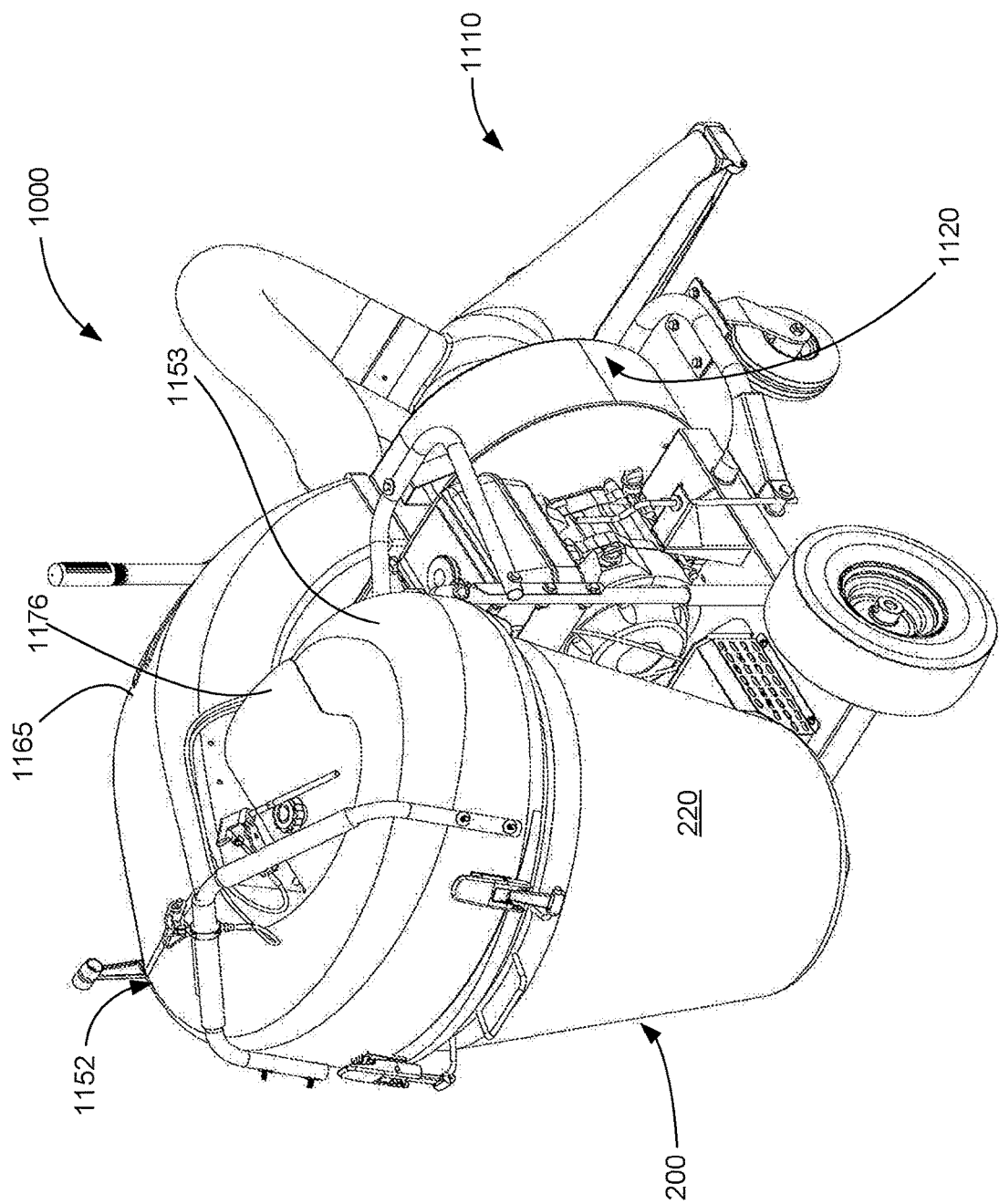
FIG. 5 is another perspective view of the debris-collecting apparatus of FIG. 4.
Figure 6:
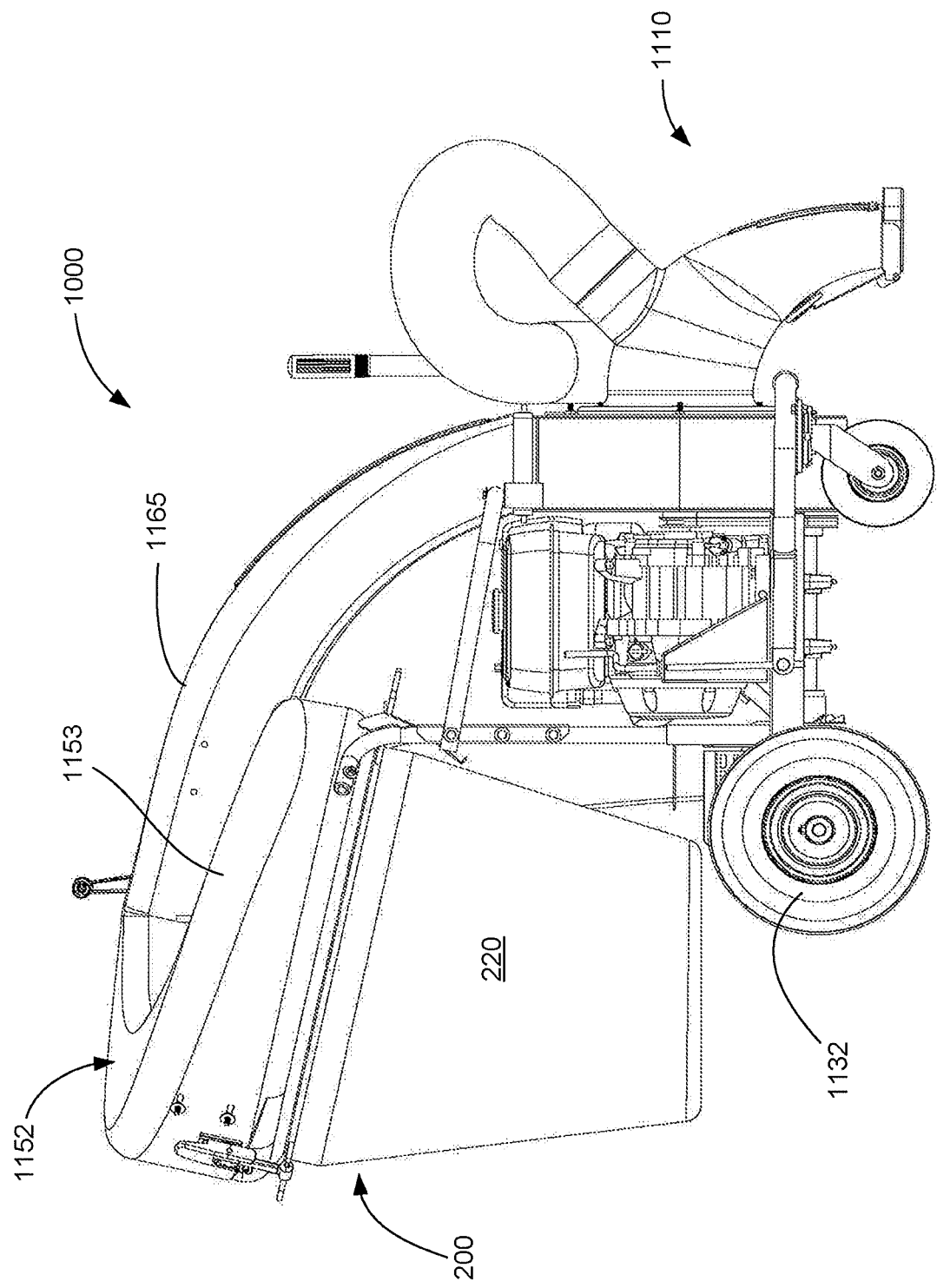
FIG. 6 is a side view of the debris-collecting apparatus of FIG. 4.
Figure 7:
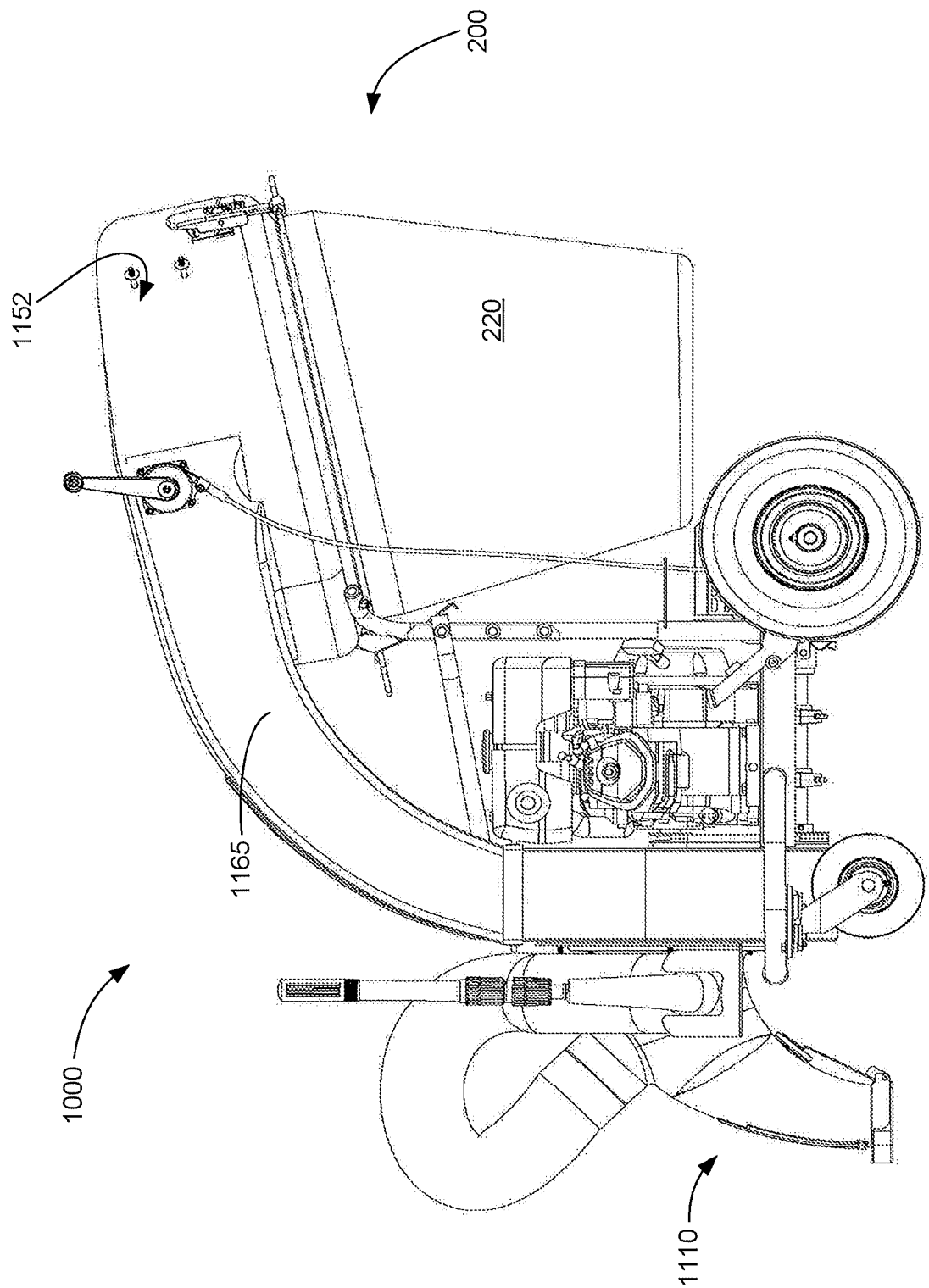
FIG. 7 is an opposite side view of the debris-collecting apparatus of FIG. 4.
Figure 8:
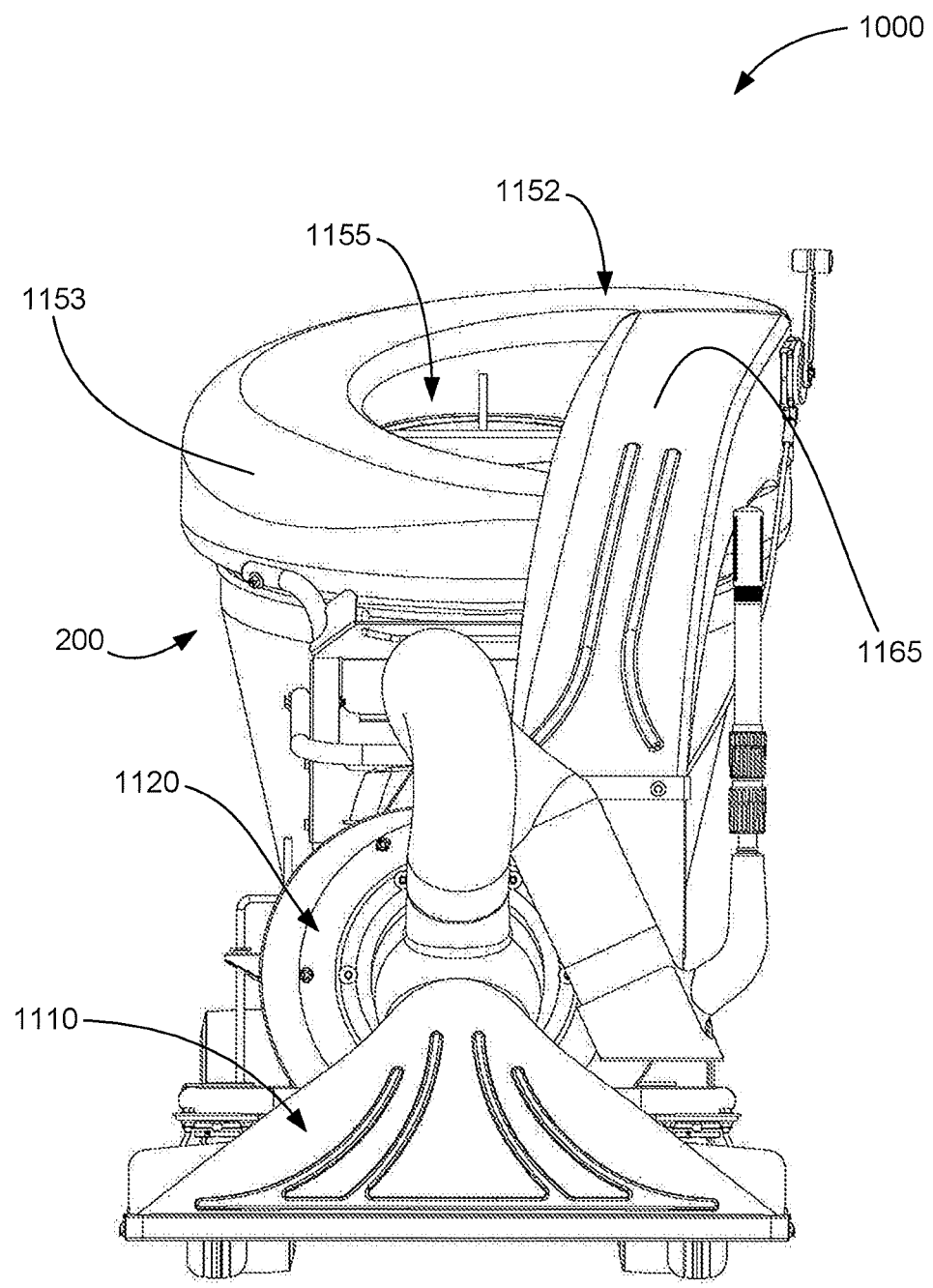
FIG. 8 is a front view of the debris-collecting apparatus of FIG. 4.

A deflecting member 1176 may cover the opening 1155, as shown in FIG. 4, to direct the air exiting the hood 1152 through the opening 1155. The deflecting member 1176 may be coupled to the filter 1158, the hood 1152, or any other appropriate structure, and in some embodiments the deflecting member 1176 is adjustable such that the direction of airflow out of the opening 1155 (e.g., angle and direction of travel) may be selected. In some embodiments that do not incorporate the filter 1170 and the deflecting member 1176, structure may nevertheless extend inside the hood 1152 to provide an inner boundary around which debris must pass to further define helical movement of air and debris.

The hood 1152 may be constructed of plastics, metals, and/or other appropriate materials. Moreover, while the helical configuration 1153 is visible in the embodiment 1000, those skilled in the art will appreciate that other external configurations may be utilized while maintaining the helical configuration 1153 internally (e.g., through baffling), and that the external helical configuration may be desirable for its aesthetic properties.

In use, then, air and debris are drawn through the input portion 1110 and to the bagging portion 1150 by the draft inducer 1120. The air and debris enter the hood 1152 of the bagging portion 1150 and are directed along the helical configuration 1153 and the ramp 1154, which may cause the self-cleaning effect discussed above. While substantially all of the debris may collect in the primary bag 210, much of the air and at least some of the debris may pass through the primary bag 210. The debris passing through the primary bag 210 may be collected in the dust skirt 220 (or, if alternately employed, the dust skirt 320). The electrical charge of the inner face of the dust skirt may aid in retaining the debris in the dust skirt as discussed above, and the primary bag 210 and the dust skirt 220 (or the dust skirt 320) may be emptied when full or desired. If the dust skirt 320 is used, the dust skirt 320 may be beaten or sprayed by an air nozzle for cleaning.

Returning now to the filter 1170, the filter 1170 may also include various materials and a secondary "dust skirt". More particularly, as shown in FIG. 11, the filter 1170 may include a sleeve 1172 of polyester non-woven felt, woven nylon, or any other desirable material, outside a frame 1173, and a dust skirt may additionally be coupled to the frame 1173 to catch debris passing through the sleeve 1172. Similar to the dust skirt 220, 320, it may be particularly desirable for the dust skirt outside the sleeve 1172 to utilize a charged material.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the present invention.

We claim:

1. A debris-collecting apparatus, comprising:
   an input portion;
   a bagging portion having a hood, an air permeable bag removably positioned lowerly adjacent the hood, and a bagging passage for directing air and debris to the hood from the input portion; the hood having a helical configuration extending from the bagging passage toward the air permeable bag; the helical configuration having inner and outer perimeters; the hood inner perimeter defining an opening in the hood inside the helical configuration; the air permeable bag having an inner face;
   a draft inducer to draw the air and debris through the input portion and to the bagging portion;
   a mobile frame operatively coupled to the input portion, the bagging portion, and the draft inducer; and
   an air permeable filter extending downwardly into the hood from the opening; the opening and the filter allowing a relatively low-pressure area to form away from the bag inner face when the draft inducer functions; a relatively high-pressure area being at the bag inner face;
   wherein the helical configuration of the hood extends such that air and debris from the bagging passage travel along the helical configuration and thereafter apply a helically-oriented dislodging force to dislodge debris collected at the bag inner face.

2. The debris-collecting apparatus of claim 1 further comprising an inner boundary around which debris must pass, the inner boundary defined between the filter and the hood.

3. The debris-collecting apparatus of claim 1, further comprising an inner boundary around which debris must pass, the inner boundary defined between the filter and the inner face of the air permeable bag.

4. The debris-collecting apparatus of claim 2, wherein the bagging passage extends at an upward angle where the bagging passage meets the hood.

5. The debris-collecting apparatus of claim 4, wherein the hood helical configuration passes underneath the bagging passage.

6. The debris-collecting apparatus of claim 5, further comprising a deflecting member over the opening, the deflecting member being below an upper end of the hood helical configuration.

7. The debris-collecting apparatus of claim 1, wherein:
   the bagging passage extends at an upward angle where the bagging passage meets the hood; and
   the hood helical configuration passes underneath the bagging passage.

8. The debris-collecting apparatus of claim 7, further comprising a deflecting member over the opening, the deflecting member being below an upper end of the hood helical configuration.

\* \* \* \* \*